US005658061A

United States Patent [19]
Miller

[11] Patent Number: 5,658,061
[45] Date of Patent: Aug. 19, 1997

[54] IMAGE GENERATING METHOD AND APPARATUS

[76] Inventor: Robert L. Miller, 756 W. Fourth St., San Pedro, Calif. 90731

[21] Appl. No.: 583,964

[22] Filed: Jan. 11, 1996

[51] Int. Cl.$^{6}$ .................... G03B 21/14
[52] U.S. Cl. .................... 353/62
[58] Field of Search .................... 353/62, 99, 3, 353/80; 359/847, 849, 850, 853; 348/771

[56] References Cited

U.S. PATENT DOCUMENTS

| | | | |
|---|---|---|---|
| 1,026,126 | 5/1912 | Roffy | 353/62 |
| 2,028,496 | 1/1936 | Chiti | 353/62 |
| 2,818,770 | 1/1958 | Cilurzo | 353/62 |
| 2,959,094 | 11/1960 | Kosma | 353/62 |

*Primary Examiner*—William Dowling
*Attorney, Agent, or Firm*—Larry D. Johnson

[57] ABSTRACT

The invention provides an efficient and versatile system for generating and displaying a portrait or other graphic image from an array of variously sized points of light, including the following embodiments: a basic pinhole portrait; a modified array with variable apertures; a secondary display of pinhole portrait images utilizing fiber optics; and a secondary display of pinhole portrait images utilizing reflected sunlight.

2 Claims, 4 Drawing Sheets

IMAGE GENERATING METHOD AND APPARATUS

BACKGROUND OF THE INVENTION

1. Field of the Invention

This invention relates generally to light images and methods for their production and display, and more specifically to an improved method and apparatus for generating "pinhole" pictures.

2. Description of the Prior Art

There are a variety of known methods for producing images such as portraits and other graphics, including, for example, projection of photographic transparencies. However, there were heretofore no known efficient methods of generating and displaying a portrait or other graphic image from a "pinhole" source, defined as an array of variously sized points of light such as those created by shining a light through apertures formed in an opaque plate.

SUMMARY OF THE INVENTION

The image generating method and apparatus of this invention provides an efficient and versatile system for generating and displaying a portrait or other graphic image from an array of variously sized points of light. The inventive method utilizes one or a plurality of the following six optical arrangements:

ARRAY OF APERTURES

1. Transmitted light
   a. an array of variously-sized translucent material apertures in an otherwise opaque plate which can be viewed directly.
   b. an array of variously-sized apertures (consisting of actual holes, or holes covered by transparent material) in an otherwise opaque plate is positioned so that light passing through the apertures reaches the viewer's eyes, and the image can be perceived by looking directly at the plate.
2. Projected light (each aperture creates a pinhole-image of the light source)
   a. an array of variously-sized transparent (or at least partially transparent) apertures in an opaque plate is positioned so that light passing through the apertures is projected onto a surface, and the projected image can be viewed by looking at that surface. The projected gray-stepped image consists of an array of variously bright pinhole images of the light source.
3. Reflected light (each small section of plane mirror acts as a reflecting pinhole)
   a. a large plane mirror positioned behind the plate of apertures will reflect light that is projected onto a surface, and that projected image can he viewed by looking at that surface. The image projected by reflection consists of an array of variously bright reflected pinhole images of the light source.
   b. an array of individual small pieces of plane mirror of various sizes can be used to achieve the same effect.

ARRAY OF SPECKS

4. Blocked light
   a. an array of variously-sized specks on a sheet of translucent material can be viewed directly.
   b. an array of variously-sized specks on a sheet of transparent material (or variously-sized beads appropriately strung on fine wires) is positioned so that light passing through the sheet (or past the beads) reaches the viewer's eyes, and the image can be perceived by looking directly at the sheet (or the beads).
5. Cast shadows (each speck casts a shadow that is a complementary pinhole-image of the light source)

An array of variously-sized specks on a sheet of transparent material (or alternately beads strung on wire) is positioned so that light passing through the sheet (or past the beads) is projected onto a surface and the projected gray-stepped image can be viewed by looking at that surface. The projected image in this case consists of an array of variously bright complementary pinhole-images of the light source.

6. Reflected shadows (each speck on a plane mirror reflects as a shadow which is a complementary pinhole-image of the light source)

A large plane mirror covered with an array of variously-sized specks will reflect light that is projected onto a surface. The specks will cast reflected shadows. The gray-stepped image can be viewed by looking directly at that surface. The gray-stepped image consists of an array of complementary pinhole-images of the light source.

In all six of the above cases the apertures (or specks) can be individually varied in size.

The inventive apparatus includes the following embodiments:

1. BASIC PINHOLE PORTRAIT: in its simplest form, a plate or other piece of material bearing an array of variously-sized apertures, such that a light source shining through the plate creates a pinhole picture which consists of either an array of pinhole images of the light source when it is projected on a surface, or that is viewed by looking directly at the plate.
2. MODIFIED PINHOLE PORTRAIT—ARRAY WITH VARIABLE APERTURES: in which the individual apertures in the array on the plate can be selectively adjusted in size, enabling the resultant image to be varied.
3. SECONDARY DISPLAY OF PINHOLE PORTRAIT IMAGES FIBER OPTICS: in which the generated image is collected and delivered to a secondary display by fiber optics.
4. SECONDARY DISPLAY OF PINHOLE PORTRAIT IMAGES REFLECTED SUNLIGHT: in which a pinhole picture is generated by appropriate positioning of an array of mirrors reflecting sunlight to a display surface. A heliostat can be used to drive one or all of the mirrors to direct sunlight to the surface.

DETAILED DESCRIPTION OF A PREFERRED EMBODIMENT

Figure 1:
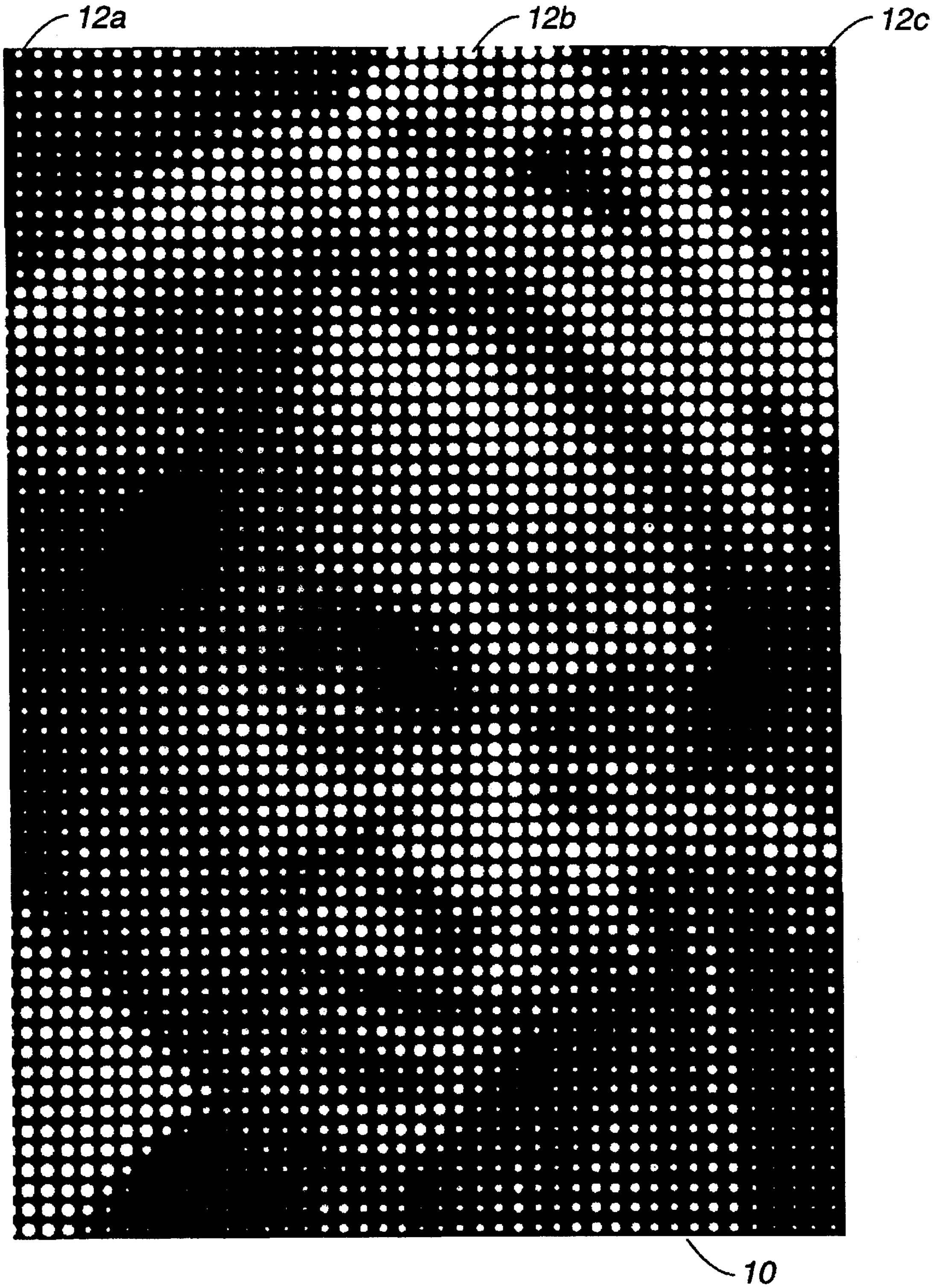
FIG. 1 is a schematic view of a basic pinhole portrait of this invention.

FIG. 1 is a schematic view of a basic pinhole portrait of this invention. A basic pinhole picture consists of a plate or piece of thin material 10 (e.g., a piece of sheet metal) that has been drilled or punched in such a way that the holes of various sizes 12*a, b, c* . . . correspond directly to the average gray step values of any one section or pixel of the image being created.

First method of viewing a pinhole picture:

A light source (e.g., the sun, a light bulb, or the diffuse light reflected from a landscape) shines on the plate. The light that passes through any one hole creates a pinhole image of the light source when it is projected on a flat white surface some distance from the hole. The intensity of the light of this projected pinhole image of the light source will be determined by the size of the hole. For example, assume that the plate consists of 1200 holes (in a 30×40 hole array) ½" apart, of eight different diameters. Then the projected array of pinhole images will consist of a 30×40 array of pinhole images of the light source of eight differing intensities, creating a gray step pixellation of the original picture.

Second method of viewing a pinhole picture:

The pinhole plate can be positioned in front of a diffuse light source (e.g., the blue sky, a white wall) and when viewed from a distance the pinhole picture can be perceived.

Third method of viewing a pinhole picture:

The holes in the opaque sheet of the pinhole plate can consist of translucent material. If the plate is illuminated from the back, the transmitted diffuse light can be viewed from the front, and the pinhole picture can be perceived.

Some basic principles:

1. A pinhole can be much larger than a "pin-sized" hole, and still produce a good pinhole image.
2. The pinhole does not have to be a round hole.
3. A small piece of mirror is a "reflecting pinhole".
4. A small object, or small opaque spot on a piece of otherwise transparent material will create a missing or "negative pinhole" image of the light source that is exactly complementary to a positive pinhole image both in light intensity and color.

Various embodiments of these applications include:

1. Simple plate of actual holes in a sheet of opaque material creating a pinhole picture consisting of pixels of various gray-step values.
2. Simple plate of pinholes which draw an outline of the picture.
3. The array of holes need not be actual holes in a sheet of material, but rather the holes can be transparent material instead, e.g., an opaque coating applied to clear acetate in such a manner as to create the array (or outline) of holes required to create the pinhole picture.
4. An array of small mirrors can be used to project by reflection the pinhole picture.
5. An array of opaque objects (or dark spots on a piece of clear material) can be used to create a pinhole picture consisting of negative images (e.g., beads arrayed on a wire).
6. Translucent glaze placed on an opaque clay sheet with variously-sized holes (e.g., in the form of a rice-bowl).
7. A flat mirror behind an acetate version will project a reflected pinhole picture (or small pieces of mirror arranged on a plane surface).
8. Small pieces of mirror arranged on convex surface will project a magnified pinhole picture.
9. Small pieces of mirror arranged on concave surface will focus or concentrate a pinhole picture.
10. Since pinholes don't have to be round, the holes can be recognizable shapes (e.g., a star, tree, or car).
11. A large array of pinhole picture plates, for example eight different pictures of differing total light intensity, can be used to create a large pinhole picture when viewed from a greater distance than is required to view one of the individual plates.
12. Combining alternatives 10 and 11 above, there can be three levels of viewing.
13. Mirrors of various sizes can be located at random locations which if properly aimed can create a reflected coherent pinhole picture.
14. Small pieces of mirror can be arranged in a regular manner to create either concave or convex fresnel-type reflectors of any particular focal length.
15. 3-D pinhole pictures can be created by appropriately curving the perforated, clear-holed or translucent sheet of material.
16. A suntan "tattoo" pinhole portrait stencil.
17. This pinhole image technology can be incorporated into the physical structure of chairs, benches, room and space dividers, privacy screens, fences, magnified reflected images, automated devices in a mall, billboards projected or viewed against diffuse light, and the like.
18. Surfaces on which a pinhole picture are projected may be flat or curved, and/or may consist of opaque or translucent material.
19. When the sun is the light source, heliostats may be used to hold a projected pinhole picture at a particular location independent of the turning of the earth.
20. Opaque spots of various sizes applied to a flat mirror will create a reflected pinhole picture which consists of an array of complementary pinhole images of the light source.
21. Opaque spots for creating a pinhole picture need not be circular.
22. Large spots equal small holes. Small spots equal large holes to create a positive pinhole picture by either method.
23. Number of pixels in array of holes or spots can be varied widely.
24. Number of gray steps can be varied widely—more steps mean better resolution.
25. When directly viewing the plate, the pinhole picture can be changed from positive to negative (disappearing at the transition point) by adjusting the light intensities on the plate and behind the plate.
26. Holes in a mirror will provide a transmitted pinhole picture projection. The reflection from the mirror will provide a reflected complementary pinhole picture (i.e., a negative). The plate of mirror of course will provide a directly-viewed pinhole picture.
27. Small pieces of mirror positioned on thin wires will provide a projected shadow pinhole picture. The reflections from the array of variously-sized small pieces of mirror will provide a reflected pinhole picture. The pinhole pictures can he either positive or negative depending on the ordering of the gray-step values.
28. Two different pinhole pictures can be created by the same array of pinhole specks by using small mirrors to cast a shadow projection of a pinhole picture and angling the mirrors so that a different reflected projection pinhole picture is created. This requires that the two different images have the same number of pixels for each of the gray-step values.

29. A projected pinhole picture can be created by applying an opaque coating to a mirror (1st or 2nd surface) with pixels of the appropriate sizes masked off to leave the pixels as small areas of mirror.
30. An automated set-up can be contrived so that someone can sit in front of a video camera and get a pinhole picture printed out, either on paper, or on clear plastic or glass.
31. Projected pinhole pictures can be projected onto a surface (e.g., painted, beaded screen) or onto a rear-projection screen.

Definitions used in this disclosure include:

Pinhole or aperture: A hole of any size in a sheet of opaque material, or transparent or translucent material covering such a hole.

Pinhole image: An image of a light source (e.g., the sun, a light bulb, or the reflected light from a landscape) created by letting the light from a light source pass through a hole in a sheet of opaque material (or reflected from a small piece of mirror) and having that light project on a surface (e.g., a piece of white paperboard).

Speck: A piece of material that prevents light (either by absorbing, scattering, reflecting or otherwise diverting the light) from reaching where it would have gone if the speck weren't there.

Negative or complementary pinhole image: an image of a light source created by blocking light with an opaque object (small relative to the size and distance of the light source). For example, a small object which casts a shadow, or a speck on a plane mirror which would reflect a shadow.

Pinhole picture: The picture created by having an appropriate array of pinhole images of various brightness.

These definitions may be tabulated as follows:

| | Created by using |
|---|---|
| Positive pinhole image: | pinhole (small hole) |
| Positive pinhole image: | mirror (small piece) |
| Negative pinhole image: | opaque object (small piece) |
| Negative pinhole image: | opaque spot on large plane mirror (or hole in mirror) |

| | Positive Image | Negative Image |
|---|---|---|
| Transmission | Hole | Spot |
| Reflection | piece of small mirror | small spot on large mirror |

Typical instructions for use of a basic pinhole portrait might include the following:

There are numerous ways to view the inventive basic pinhole portrait, e.g.: 1) by shining light through the holes in the plate and looking at the projected image; or 2) by looking directly at the plate which has been positioned in front of a bright, diffuse light source.

How to use it and view it:

Outside: Take it outside on a clear sunny day. Bring along a piece of stiff white paperboard approximately 18"×24". Position the white board so that its surface is perpendicular to the "rays" of the sun. Hold the inventive plate about a foot in front of the white screen. Now pull the plate away from the white screen. When you have pulled the plate back about four feet or so, the projected pinhole images of the sun will just touch each other. Now take turns with another person and stand back (up to fifty feet away) to view the portrait that is projected onto the white surface.

You can also hold or hang the inventive plate about four feet in front of a sunlit light-colored wall. Now if you back away (again, up to fifty feet away) you can view the portrait both ways: 1) by looking at the image projected onto the wall; and 2) by looking directly at the plate with the bright wall behind it.

If you don't have a sunny day, you can still view the portrait outside by holding or hanging the plate so that its background is the bright, diffuse light of the sky. Up close, it will be difficult to discern the portrait; but, as you view it from farther and farther away, the resolution keeps improving. At about fifty feet away, the resolution may surprise you. How counter-intuitive! Usually, you get closer to something the better to see it.

Inside: Indoors, the plate can be hung in front of a brightly-lit white wall, or it can be mounted on a light box. If your space is limited, or if it is inconvenient for the viewer to back away or to maintain an unobstructed view, a flat mirror of sufficient size can be hung about fifteen to twenty-five feet away, allowing the viewer to view the plate up close, then turn to view the portrait by looking at the distant reflection in the mirror. It may help to hang the plate and mirror about head-height to maintain an unobstructed view.

If you want to see the projected pinhole portrait indoors, hang it about four feet in front of an unlit white wall in a fairly dark area. Now use one of a variety of light sources (such as a flashlight, a spotlight, or the beam from a slide projector) and shine the light onto the plate. Each hole in the plate will create a pinhole image of the light source, and the overall array of these pinhole images will form the projected pinhole portrait on the darkened wall. Try the slide projector with and without a slide, in and out of focus, and at various distances. You may be pleased with the results. Have fun. It's the best way to learn something.

On sunny but hazy days, the projected pinhole portrait made up of the pinhole images of the sun can be washed out a bit by the bright, diffuse light from the hazy sky. Even on clear sunny days this can happen if your white projection board is receiving diffuse reflected light from the brightly illuminated pavement or nearby bright walls or objects.

In summer, around midday, especially at more southerly latitudes, the sun will be high in the sky. This means that your white projection board which was positioned perpendicular to the rays of the sun will be tilted so far back from a vertical position, that the projected portrait will be somewhat skewed when viewed from a distance. Never mind; do it earlier in the morning or later in the afternoon, or climb a tree, or go up on a balcony to view it properly.

If you're trying to see the pinhole portrait by holding the plate with the bright diffuse light of the sky behind it, the contrast will be enhanced if you position it so that the direct sunlight isn't striking the front of the plate.

If you want to see the pinhole portrait as a negative, position the plate so that there is a dark area behind it. Now illuminate the front of the plate with a bright light. Use rheostats to control the light levels behind the plate and on the plate, and you might make the portrait disappear.

MODIFIED PINHOLE PORTRAIT—ARRAY WITH VARIABLE APERTURES

Figure 2:
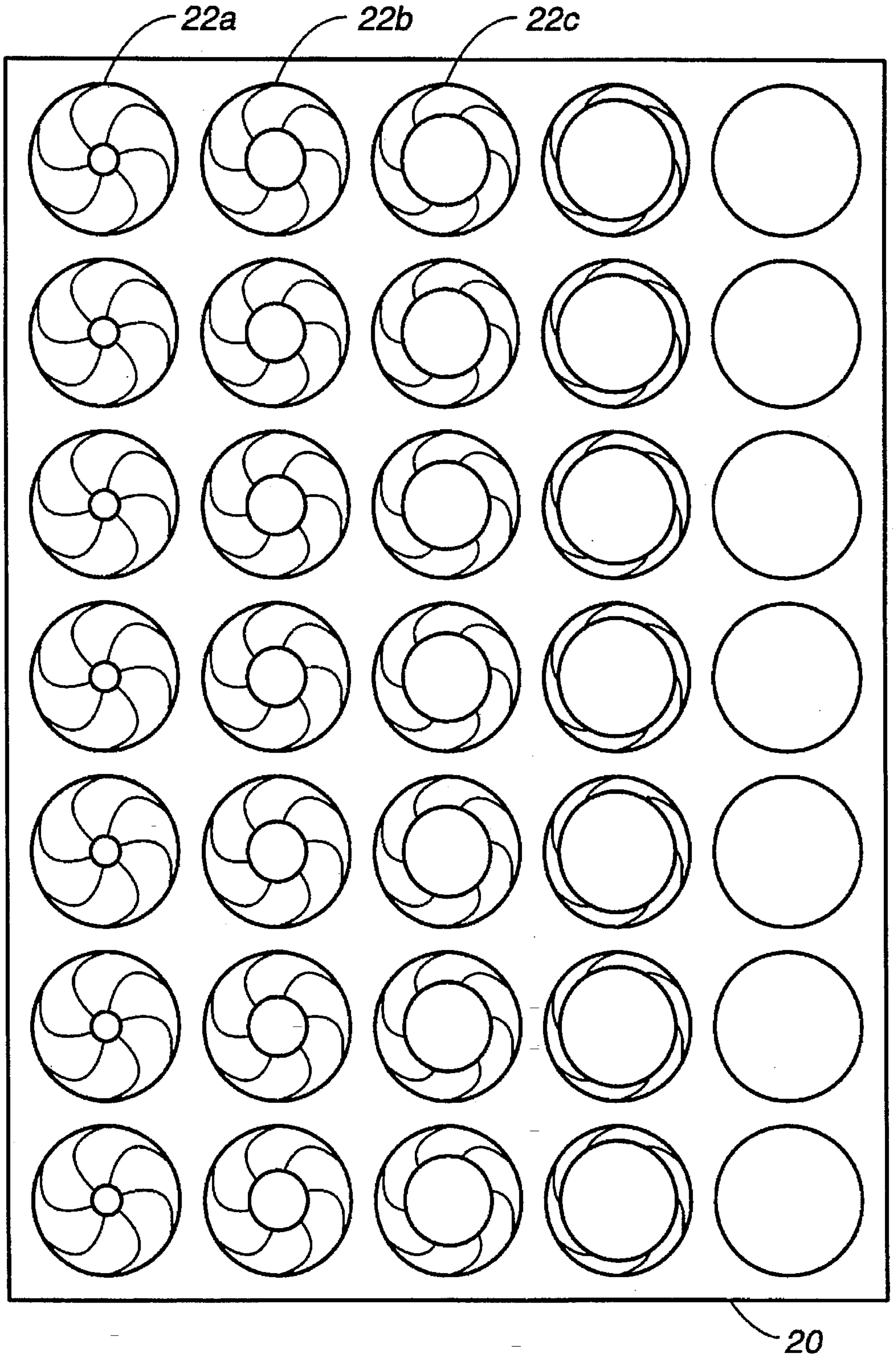
FIG. 2 is a schematic view of a modified pinhole portrait array with variable apertures.

FIG. 2 is a schematic view of a modified pinhole portrait array 20 with variable apertures 22 a, b, c . . .

Individual holes in an array (e.g., on a plate) can be varied in size by creating the holes with iris diaphragms either mechanically or electrically controlled, which allows individual pixel size (i.e., brightness) to be varied.

This means that a pinhole picture (whether projected or viewed directly) can be changed to another picture mechanically or electrically. In the case of electrically controlled iris diaphragms these changes can be made remotely, and that by using a computer to pixelate an image, it can be done automatically. This allows for displaying moving pinhole pictures (e.g., outdoor daytime displays), with or without a heliostat for projected pictures made up of images of the sun; or directly viewed outdoor billboard displays that can be changed easily and remotely, with either static or moving images.

Alternatives to iris diaphragms for varying hole size/brightness include:

1. Rotating variable filters (variable density disc, circular change in hole size).
2. Linear motion change such as a sliding mask.
3. Electronic light dimmer using some kind of optical switch or rheostat such as a glass filter that darkens or lightens by application of an electrical field.
4. Pivoting circular mask (on an axis perpendicular to the optic fiber).
5. If there is a critical angle for the fiber optic bending radius, light could be controlled by bending a flexible optic fiber.
6. The optical fiber itself could be moved relative to a fixed-sized aperture to affect intensity.

SECONDARY DISPLAY OF PINHOLE PORTRAIT IMAGES—FIBER OPTICS

Figure 3:
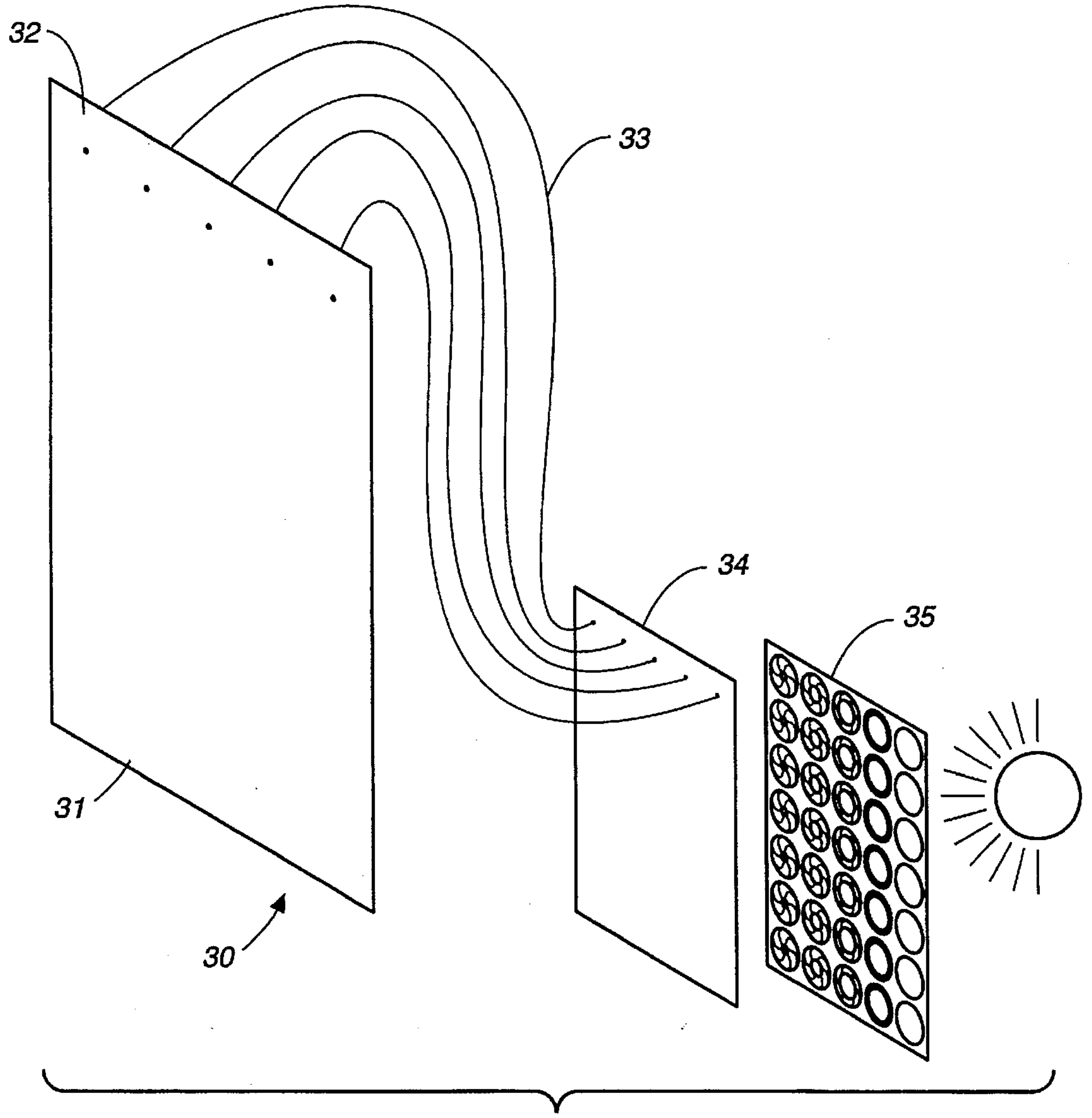
FIG. 3 is a schematic view of a secondary display of pinhole portrait images utilizing fiber optics.

FIG. 3 is a schematic view of a secondary display 30 of pinhole portrait images utilizing fiber optics.

This method uses fiber optics to direct light to a pixellated display of pinhole pictures. A display board 31 of any size, up to and including billboard-sized displays or larger, can consist of an array of pixels 32 all the same size, each of which has light directed to it through a fiber optic flexible rod 33. The light can come directly out of a flat polished end of the fiber rod or can illuminate a diffusing surface.

Assume an array of 1200 pixels (30×40). The display board pixels could be spaced at 6" center to center distances. Now the bundle of 1200 fibers is led to the input board 34. The input board consists of the polished ends of the 1200 fibers being arranged in a 30×40 array with a one-to-one correspondence to the location of the pixels in the display board. The input board fibers can be positioned, say, on ½" or 2" center-to-center distances. A template 35, such as a basic pinhole portrait, is placed on the input board fiber array and illuminated with bright light, either artificial light or sunlight. For example, sunlight could be directed to the template by use of a heliostat, if desired. The light is piped to the large display board by the optical fibers. Optical cones, funnels, or lenses (regular convex or fresnel) can be used to collect more light into each optical fiber.

This optical fiber system allows for using small inexpensively fabricated pinhole picture templates to create large bright pixellated displays. In addition, the template can be the iris diaphragm type (described supra) which allows for displaying moving or kinetic large pinhole picture displays.

Three optic fibers per pixel will allow for possible three-color based full spectrum color moving displays of pinhole pictures. Three input boards may be used, one for each primary color (red, blue, green). Transparent colored gels or prisms or diffraction grating can be used to separate white light into the red-green-blue portions of the spectrum to be fed into the corresponding red, green or blue input boards.

Pixels in the input boards do not necessarily have to be arranged in the x,y coordinate arrangement of the pixels of the display boards. To use a static filter like a simple pinhole portrait, the x,y coordinate correspondence is required. With the iris diaphragm filter it can or cannot have the x,y pixel coordinate correspondence. An image can be scanned and either stored or fed directly to the iris diaphragm filters.

The display panel may itself incorporate iris diaphragms for varying individual pixel intensity.

SECONDARY DISPLAY OF PINHOLE PORTRAIT IMAGES—REFLECTED SUNLIGHT

Figure 4:
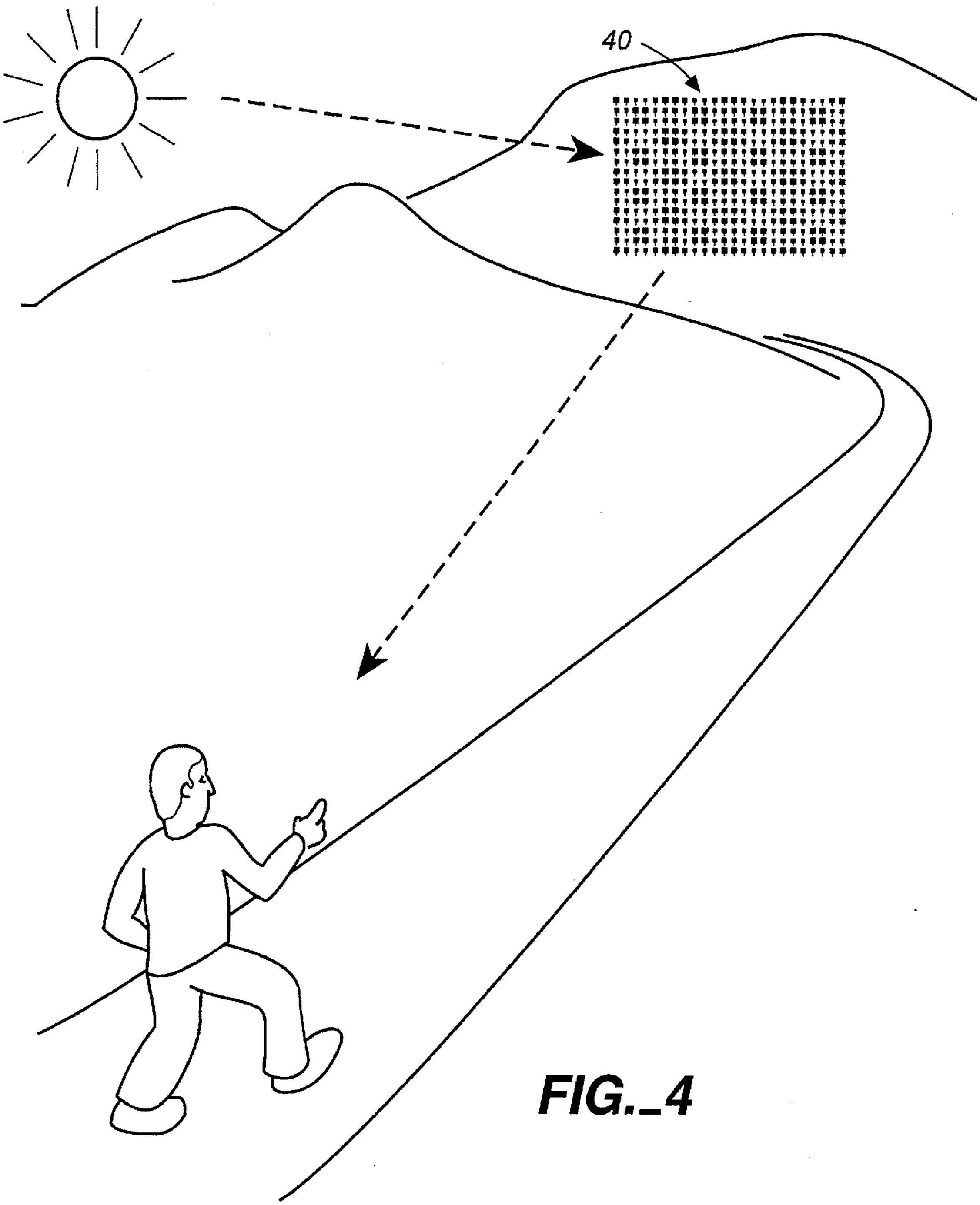
FIG. 4 is a schematic view of a secondary display of pinhole portrait images utilizing reflected sunlight.

FIG. 4 is a schematic view of a secondary display of pinhole portrait images utilizing reflected sunlight.

To produce large bright displays viewable from miles away, sunlight reflected from a mirror provides an extremely bright ground level light source. Therefore, a pinhole picture (from mirrors or reflecting pinholes) can be created by appropriately positioning an array of variously-sized mirrors 40 so that the reflected sunlight creates a pinhole picture when viewed from a distance. These can be colorized by placing appropriate colored gels on the mirror, for static pinhole pictures.

The mirrors need not be physically connected but could be positioned, for example, fifty feet apart. A static pinhole picture would appear and disappear once a day as the sun moves across the sky.

Such an array of reflecting pinholes could be varied in size by positioning of iris diaphragms in front of the mirrors. Such iris diaphragms could be remotely radio-controlled. Iris diaphragms could be powered by small solar cells, since power is only needed when the sun shines. Small individual heliostats could drive the mirrors to direct the sunlight so that the image is visible all day long. Finally, the array could be made up of convex mirrors to widen the angle from which the mirror array can be viewed.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and their legal equivalents.

What is claimed as invention is:

1. A method for generating an image, said method comprising the steps of:

providing an opaque plate;

providing a plurality of selectively adjustable-sized apertures in said plate; and shining a light source through said plurality of apertures to create a pinhole picture consisting of an array of pinhole images of said light source upon a surface some distance from said plate.

2. A method for generating an image, said method comprising the steps of:

providing an opaque plate;

providing a plurality of variously-sized apertures in said opaque plate;

shining a light source through said apertures to an array of fiber optic cables placed adjacent said apertures;

delivering light from said light source through said array of fiber optic cables to a display surface to create a pinhole picture.

* * * * *